United States Patent
Freeman et al.

(10) Patent No.: US 10,543,736 B2
(45) Date of Patent: Jan. 28, 2020

(54) VEHICLE CABIN AIR MANAGEMENT

(71) Applicant: FORD GLOBAL TECHNOLOGIES, LLC, Dearborn, MI (US)

(72) Inventors: Michael James Freeman, Allen Park, MI (US); Gavin Smith, Ann Arbor, MI (US)

(73) Assignee: FORD GLOBAL TECHNOLOGIES, LLC, Southfield, MI (US)

( * ) Notice: Subject to any disclaimer, the term of this patent is extended or adjusted under 35 U.S.C. 154(b) by 880 days.

(21) Appl. No.: 13/653,525

(22) Filed: Oct. 17, 2012

(65) Prior Publication Data
US 2014/0106658 A1    Apr. 17, 2014

(51) Int. Cl.
*B60H 1/24* (2006.01)
*B60H 1/00* (2006.01)

(52) U.S. Cl.
CPC ......... *B60H 1/249* (2013.01); *B60H 1/00664* (2013.01); *Y10T 29/49826* (2015.01)

(58) Field of Classification Search
CPC    B60H 1/249; B60H 1/00664; B60H 1/00671; B60H 1/00678; B60H 2001/00728; B60H 1/00028; B60H 1/00507; B60H 1/00535; B60H 2001/00635; B60H 2001/00099; Y10T 29/49826
USPC ............ 454/69, 70, 162, 164; 137/843, 852
See application file for complete search history.

(56) References Cited

U.S. PATENT DOCUMENTS

| | | | | |
|---|---|---|---|---|
| 3,391,628 A | * | 7/1968 | Ziegenfelder | B60H 1/248 454/164 |
| 3,405,968 A | * | 10/1968 | Feles et al. | 454/164 |
| 3,698,429 A | * | 10/1972 | Lowe et al. | 137/601.06 |
| 4,704,951 A | * | 11/1987 | Pruchon | F16K 17/12 137/102 |
| 4,781,106 A | * | 11/1988 | Frien | B60H 1/249 137/512.1 |
| 4,805,776 A | * | 2/1989 | Namgyal | A45C 3/00 206/523 |
| 4,932,315 A | * | 6/1990 | Dixon | B60H 1/248 428/352 |
| 4,967,490 A | * | 11/1990 | Berger | D06F 58/20 34/235 |
| 4,972,765 A | * | 11/1990 | Dixon | B60H 1/248 137/855 |
| 5,085,132 A | * | 2/1992 | Ikeda | B60H 1/249 454/158 |

(Continued)

FOREIGN PATENT DOCUMENTS

DE    10052003 A1 *  11/2001  ............... B60H 1/00
JP    58183308 A  *  10/1983

*Primary Examiner* — Gregory L Huson
*Assistant Examiner* — Frances F. Hamilton
(74) *Attorney, Agent, or Firm* — Vichit Chea; Brooks Kushman P.C.

(57) ABSTRACT

A vehicle cabin pressure relief device is provided having a base layer defining an aperture, a retainer layer disposed on the base layer; and a sealing member. The sealing member further includes a first portion and a second portion extending from the first portion, wherein the second portion of the sealing member is sandwiched between the base layer and the retainer layer. The first portion is also displaceable relative to the base layer, and covers a portion of the aperture in a closed first position.

3 Claims, 4 Drawing Sheets

(56) References Cited

U.S. PATENT DOCUMENTS

| | | | |
|---|---|---|---|
| 5,095,659 A * | 3/1992 | Benoit | B60J 5/0416 292/141 |
| 5,167,574 A * | 12/1992 | Ikeda | B60H 1/00664 137/512.1 |
| 5,194,038 A * | 3/1993 | Klomhaus | B60H 1/249 137/512.1 |
| 5,263,895 A * | 11/1993 | Kraus et al. | 454/162 |
| 5,322,213 A * | 6/1994 | Carter et al. | 229/166 |
| 5,355,629 A * | 10/1994 | Kimura | B60J 5/0416 296/146.2 |
| 5,492,505 A * | 2/1996 | Bell et al. | 454/162 |
| 5,503,178 A * | 4/1996 | Miskelley et al. | 137/67 |
| 5,671,802 A * | 9/1997 | Rogers | B60R 16/0239 123/198 E |
| 5,695,397 A | 12/1997 | Frank et al. | |
| 5,727,999 A * | 3/1998 | Lewis | B60H 1/249 137/527.8 |
| 5,759,097 A * | 6/1998 | Bernoville | B60H 1/249 137/512.1 |
| 5,775,357 A * | 7/1998 | Regna | B60K 15/03519 137/43 |
| 5,904,618 A * | 5/1999 | Lewis | 454/162 |
| 6,210,266 B1 * | 4/2001 | Barton | B29C 45/1676 137/855 |
| 6,273,127 B1 | 8/2001 | Wade | |
| 6,357,473 B1 * | 3/2002 | Porter | B60H 1/249 137/512.15 |
| 6,412,755 B2 * | 7/2002 | Ito | B60H 1/00671 251/173 |
| 6,609,535 B2 * | 8/2003 | Oppermann | F01L 3/205 123/65 V |
| 6,692,347 B1 | 2/2004 | Schneider | |
| 6,705,833 B2 * | 3/2004 | Tam | F04D 25/14 29/888.024 |
| 6,820,920 B2 * | 11/2004 | Maeda | B60J 5/103 296/146.12 |
| 7,040,345 B2 * | 5/2006 | Koeger | F16K 15/03 137/15.17 |
| 7,044,164 B2 * | 5/2006 | Carlson | B60H 1/249 137/315.33 |
| 7,182,093 B2 * | 2/2007 | Call et al. | 137/15.18 |
| 7,517,280 B2 * | 4/2009 | McConnell et al. | 454/162 |
| 7,625,037 B2 * | 12/2009 | Gollehur | B62D 25/24 296/193.07 |
| 7,800,902 B2 * | 9/2010 | Della Fiora | H05K 7/20145 361/679.48 |
| 7,963,831 B2 * | 6/2011 | He | B60H 1/00278 180/68.1 |
| 8,007,228 B2 * | 8/2011 | Wang | F04D 25/0613 415/146 |
| 8,429,929 B2 * | 4/2013 | Aragon | 62/449 |
| 8,601,740 B2 * | 12/2013 | Tu | H05K 7/20181 49/87.1 |
| 8,696,049 B2 * | 4/2014 | Hagino | B60H 1/28 296/192 |
| 2002/0111131 A1 * | 8/2002 | Demerath | 454/162 |
| 2005/0081921 A1 * | 4/2005 | Blake et al. | 137/512.15 |
| 2006/0016482 A1 * | 1/2006 | Berens | F16K 15/031 137/512.15 |
| 2007/0044383 A1 * | 3/2007 | Marshall | B60H 1/00664 49/478.1 |
| 2008/0076344 A1 * | 3/2008 | Flowerday | 454/162 |
| 2008/0200109 A1 * | 8/2008 | Valencia | 454/70 |
| 2009/0104866 A1 * | 4/2009 | Loewe | 454/162 |
| 2009/0111371 A1 * | 4/2009 | Niezur | B62D 25/24 454/164 |
| 2010/0120346 A1 * | 5/2010 | Jansen | 454/152 |
| 2010/0216384 A1 | 8/2010 | McCarthy et al. | |
| 2010/0267324 A1 * | 10/2010 | Mutton | F24F 13/15 454/168 |
| 2010/0291854 A1 * | 11/2010 | Carlson et al. | 454/162 |
| 2011/0041930 A1 * | 2/2011 | Kiezulas | 137/527 |
| 2012/0145257 A1 * | 6/2012 | Li | F16K 15/035 137/215 |
| 2012/0266975 A1 * | 10/2012 | Kelly | E04B 1/7038 137/357 |
| 2013/0160366 A1 * | 6/2013 | Tu | H05K 7/20181 49/82.1 |

* cited by examiner

VEHICLE CABIN AIR MANAGEMENT

TECHNICAL FIELD

The invention relates to managing the air pressure in a vehicle passenger cabin.

BACKGROUND

Vehicles require means to influence air flow to and from the vehicle cabin to enhance passenger comfort. As the climate control system takes in ambient air from outside the vehicle, air exhaustion from the vehicle may be required to attain proper circulation. Similarly, as vehicle doors, liftgates, deck lids, window, etc. are closed, a sudden pressure rise may be created.

Air exhaustion devices are suitable to relieve the pressure rise caused by actuation of closure panels. These devices may function as a one-way valve that allows air to escape from the cabin while inhibiting ambient air, water, and contaminant infiltration. While current designs may be suitable for some applications, they often consume valuable package space and provide minimal flexibility for placement of other components that may be located in similar areas of the vehicle.

SUMMARY

In at least one embodiment, a vehicle cabin pressure relief device is provided having a base layer defining an aperture, a retainer layer disposed on the base layer, and a sealing member. The sealing member further includes a first portion and a second portion extending from the first portion, wherein the second portion of the sealing member is sandwiched between the base layer and the retainer layer. The first portion is also displaceable relative to the base layer, and covers a portion of the aperture in a closed first position.

In another embodiment, a device for reducing air flow into a vehicle cabin is provided. The device includes a base layer capable of surrounding a vehicle aperture, where the base layer also defines a through hole. The device further includes a series of sealing members attached to the base layer, and a retainer layer disposed on the base layer. A portion of each of the sealing members is sandwiched between the base layer and the retainer layer. Further, the sealing members cooperate to substantially seal the vehicle aperture in response to a pressure in the ambient environment being greater than a pressure within the vehicle cabin by a threshold amount.

In at least one additional embodiment, a method of repurposing a body structure tooling access hole as an air pressure release hole is provided. The method includes providing a unidirectional airflow device capable of covering a body structure tooling access hole, and aligning the unidirectional airflow device relative to the body structure tooling access hole. The method further includes installing the unidirectional airflow device over the body structure tooling access hole, such that the unidirectional airflow device is capable of exhausting air in response to a pressure in the vehicle cabin being greater than a pressure in an ambient environment by a first threshold.

Various embodiments according to the present disclosure may provide one or more advantages relative to previous cabin pressure relief devices. For example, one or more embodiments provide a cabin pressure control device amenable to irregularly-shaped vehicle body apertures. The associated lower investment/tooling cost may facilitate more flexibility in customizing the shape of the pressure relief device to fit over apertures used for vehicle body assembly, reducing or eliminating the need for single-purpose venting apertures. The layered construction of various embodiments results in a thin profile to better utilize available packaging space and accommodate various other vehicle components.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Passenger vehicles utilize various forms of air circulation. Vehicle air exhaustion also aids in the facilitation of proper air circulation, as well as the normalization of air pressure between the interior cabin and the ambient environment. For example, as the vehicle climate control system provides an intake of fresh air to the passenger cabin, there is a corresponding need to exhaust air from the cabin. Also, upon the closing impact of vehicle doors, trunk, hatch and the like, an inertial air pressure effect is realized creating a sudden pressure rise inside the passenger cabin. To avoid potential discomfort to passengers, rapid air exhaustion may be used to counteract the pressure spike. An aperture in the vehicle body can provide a fluid connection between the interior cabin and the ambient air. An air exhaustion device in cooperation with the vehicle aperture can be used to manage air exhaustion and enhance passenger comfort.

Figure 1:
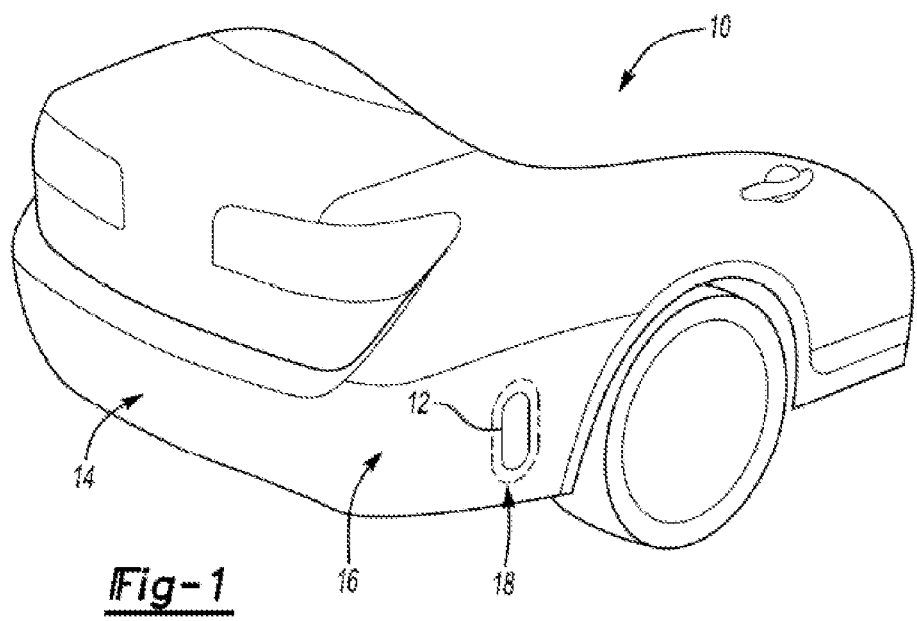
FIG. 1 illustrates a representative placement of a cabin pressure relief device in a rear end of a vehicle.

FIG. 1 depicts a portion of a vehicle 10 having an aperture 12 in fluid connection with the interior passenger cabin. The vehicle aperture 12 serves as a means of air extraction out of a rear portion 14 of the vehicle 10 body. A cabin pressure management device, or air extractor, can be located on the vehicle 10 body over the aperture 12. The device is typically located so as to be visually hidden beneath the appearance portion of a rear bumper cover 16. This location is suitable since it is generally a low pressure region when the vehicle 10 is in motion. At conventional vehicle travel speeds, the pressure is low enough in this region to cause an effect of drawing air from the vehicle through the air extractor. In other words, the vehicle 10 cabin pressure exceeds the ambient air pressure in this location. Once the differential in pressure exceeds a threshold amount, the extractor is capable of relieving pressure from the vehicle 10. The location indicted by phantom lines 18 represents a suitable position of the extraction device. Additionally, it is typical that at least one additional air extractor is disposed on the opposite side of the vehicle 10 in a similar position. Those of ordinary skill in the art may recognize various other locations suitable for an air extractor according to various embodiments of the present disclosure depending on the particular application and implementation.

Vehicle technological advances have driven a need to locate several other devices in a similar area as an air extractor. It is common for electronic modules, such as parking assist modules and lane departure devices, to have functional requirements necessitating placement in the lower rear portion 14 of the vehicle 10. Current solutions include providing independent body features to accept each device in the region, causing tight package conditions. Additionally, body construction assembly methods often require tooling access holes in the same lower rear region. Shape considerations of the tooling access hole are primarily driven solely by the manufacturing needs. The vehicle body is often constructed using a tool that is directed through the tooling access hole. Therefore, the resultant shape of the hole may not be conducive to current air extractor devices. However the tooling access hole is still required to be sealed, for example by a grommet or adhesive tape. The present disclosure recognizes that it may be advantageous to use the same tooling access hole as a means for air extraction from the vehicle. One aspect of the present disclosure is to re-purpose existing vehicle apertures and use them for achieving managed vehicle air extraction. An adhesively retained air extractor according to the present disclosure can provide for more uniquely configurable air extractor devices that can be applied over non-uniform holes, such as tooling access holes, for example. A low cost design is presented herein that is suitable to balance part costs with customization for various vehicle configurations.

Provided that the location of an air pressure management device is in the lower rear region of the vehicle, it can be also desirable to configure the device to manage one-way air flow through the aperture. For example, an air extraction device located near the vehicle exhaust needs to inhibit back flow of exhaust fumes into the vehicle cabin. The invention of the present disclosure aids in preventing air which may contain contaminants from flowing back into the vehicle cabin through the aperture. The air pressure management device is configured to substantially seal the vehicle aperture 12 in response to the air pressure in the ambient environment being greater than the internal vehicle cabin pressure by a threshold amount. The negative pressure forces sealing members to substantially close off the aperture thereby inhibiting air from entering the vehicle cabin.

Referring to FIGS. 2 through 5, embodiments of a unidirectional airflow device, air extractor, or cabin pressure relief device is generally indicated by reference numeral 50. The air extractor 50 includes a base layer 52 having an aperture 54, or through hole that passes through the base layer. The base layer 52 also has an outer surface 56 suitable to receive one or more displaceable sealing members 58, 60, and 62. The outer surface 56 of the base layer 52 can be provided with an adhesive that serves to position and retain the sealing members 58, 60, and 62. It is contemplated that a varying number of sealing members may be suitable to achieve a desired opening area. Each of the sealing members has a first portion 64 that is displaceable relative to the base layer 52, and a second portion 66 that is affixed to the base layer 52. The sealing members 58, 60, and 62 each can be displaceable relative to the base layer 52. In at least one embodiment, the second portion 66 comprises tab protrusions that extend from the first portion 64 of each sealing member.

The base layer 52 is further provided with an inner surface 68 on the opposite side from the outer surface 56. The inner surface 68 may be provided with an adhesive material capable of interfacing with and retaining the base layer 52 to the vehicle 10 body. In at least one embodiment, the base layer 52 is constructed from a resilient plastic sheet material reinforced with an inner corrugated structural layer.

The air extractor 50 is also provided with a retainer layer 70 configured to attach to base layer 52. The retainer layer 70 may define an aperture 72 through the layer. It should be appreciated that the aperture 72 of the retainer layer 70 may be uniquely sized to create an offset relative to the aperture 54 of the base layer 52. The retainer layer 70 may also comprise a number of strips. The retainer layer 70 also includes an inner surface 74 having adhesive. The retaining layer 70 sandwiches the second portion 66 of each of the sealing members 58, 60, 62. In areas where no portion of a sealing member is sandwiched, the retainer layer 70 may be affixed directly to the base layer 52. The first portion 64 of the sealing members is not sandwiched between the base layer 52 and the retaining layer 70, and remains free to move relative to the base and retaining layers 52, 70.

The sealing members 58, 60, and 62 may be arranged in a series such that there is an overlap between sealing members. Each adjacent pair of sealing members can overlap and seal against the other when in the first position. According to an embodiment, the sealing members 58, 60, and 62 are freely rotatable about axes 76, 78, and 80 respectively, between a first position being substantially closed, and a range of open second positions. The first position of the sealing members 58, 60, 62 covers and substantially seals the aperture 54 of the air extractor 50. Any of the range of open positions allows air to pass through the air extractor 50. In at least one embodiment, the width of the first portion 64 of each of the sealing members is greater than the distance across the portion of the apertures 54, 72 that the sealing members cover. As discussed above, the aperture 72 in the retainer layer 70 may have a width different than that of the aperture 54 of the base layer 52. This offset arrangement of the apertures can help to avoid gapping which allows air to pass through the extractor 50 when the sealing members are in the closed first position.

The sealing members 58, 60, and 62 can further be provided with a sealing medium 82 to enhance the sealing between the interfacing parts. In at least one embodiment, the sealing medium 82 is applied to the free end 83 of each sealing member, and can increase the fluid restricting capability of the air extractor 50 when the sealing members are in the first position.

In another embodiment, each of sealing members 58, 60, and 62 may also include semi-rigid portions, or support members 84, located along the hinged proximate end and/or the free distal end 83. The semi-rigid support members 84 help to prevent inversion of the sealing members to an opposite side of the base layer 52.

Figure 2:
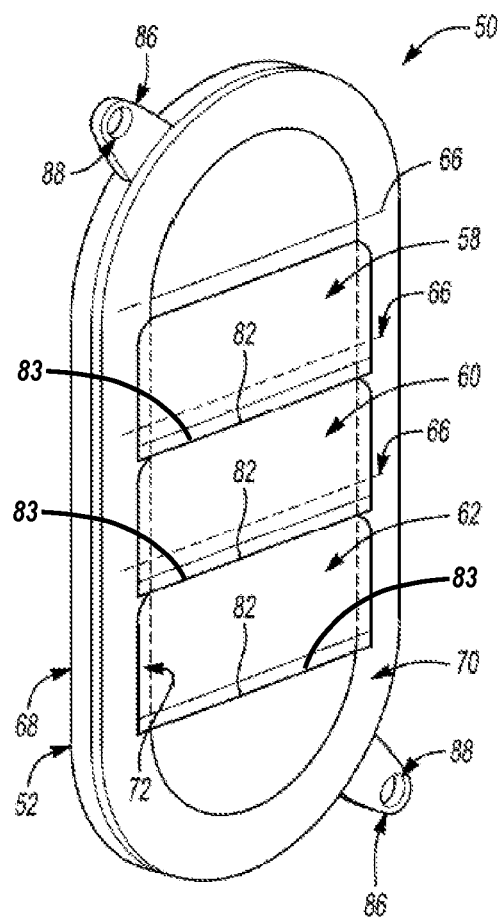
FIG. 2 illustrates a representative embodiment of cabin pressure relief device with sealing members in a closed first position.
Figure 3:
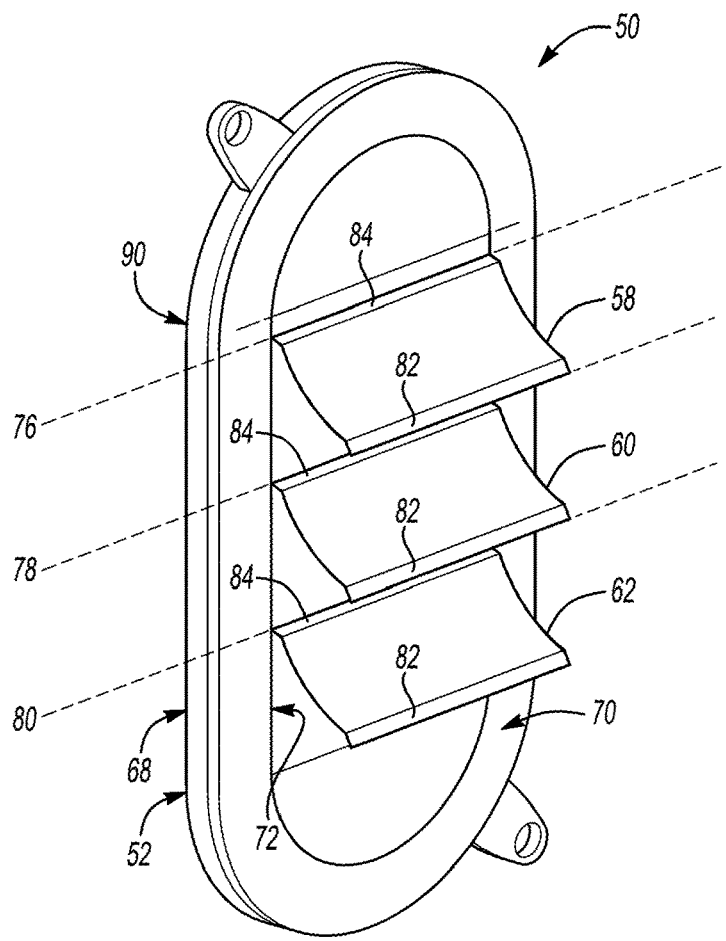
FIG. 3 illustrates a cabin pressure relief device embodiment with sealing members in an open second position.
Figure 4:
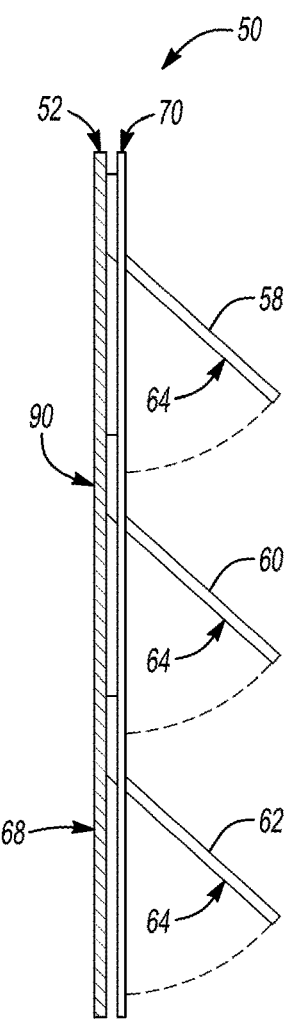
FIG. 4 is a diagrammatic side view of a cabin pressure relief device according to an embodiment.

Referring specifically to FIG. 2, the air extractor 50 may also be provided with locating features 86. In at least one embodiment, the base layer 52 includes two protrusions from the outer perimeter to house locating features. A locating feature 86 may define a locating hole 88 to aid in alignment of the air extractor. One example of such alignment may be a locating push pin (not shown) which locates and secures to corresponding holes in the vehicle 10 body. A push pin or similar locating feature may also add to the overall retention of the air extractor. Alternatively, the position of the locating holes 88 of the locating feature 86 may correspond to dimple-type protrusions provided on the vehicle 10 body. Therefore, an assembly operator may align the locating features 86 of the air extractor 50 prior to securing the adhesive portion of the base layer 52 to the vehicle 10 body.

In order to further facilitate assembly of the air extractor 50 to the vehicle 10, the device may be shipped with a sacrificial release liner 90 applied to the inner surface 68 of the base layer 52 in order to shield the adhesive material. This way, the strength of adhesion of the adhesive material can be protected until such time as the release liner 90 is removed prior to installation on the vehicle 10. Foreign objects and debris are prevented from contaminating the adhesive material a strip during transit.

Figure 5:
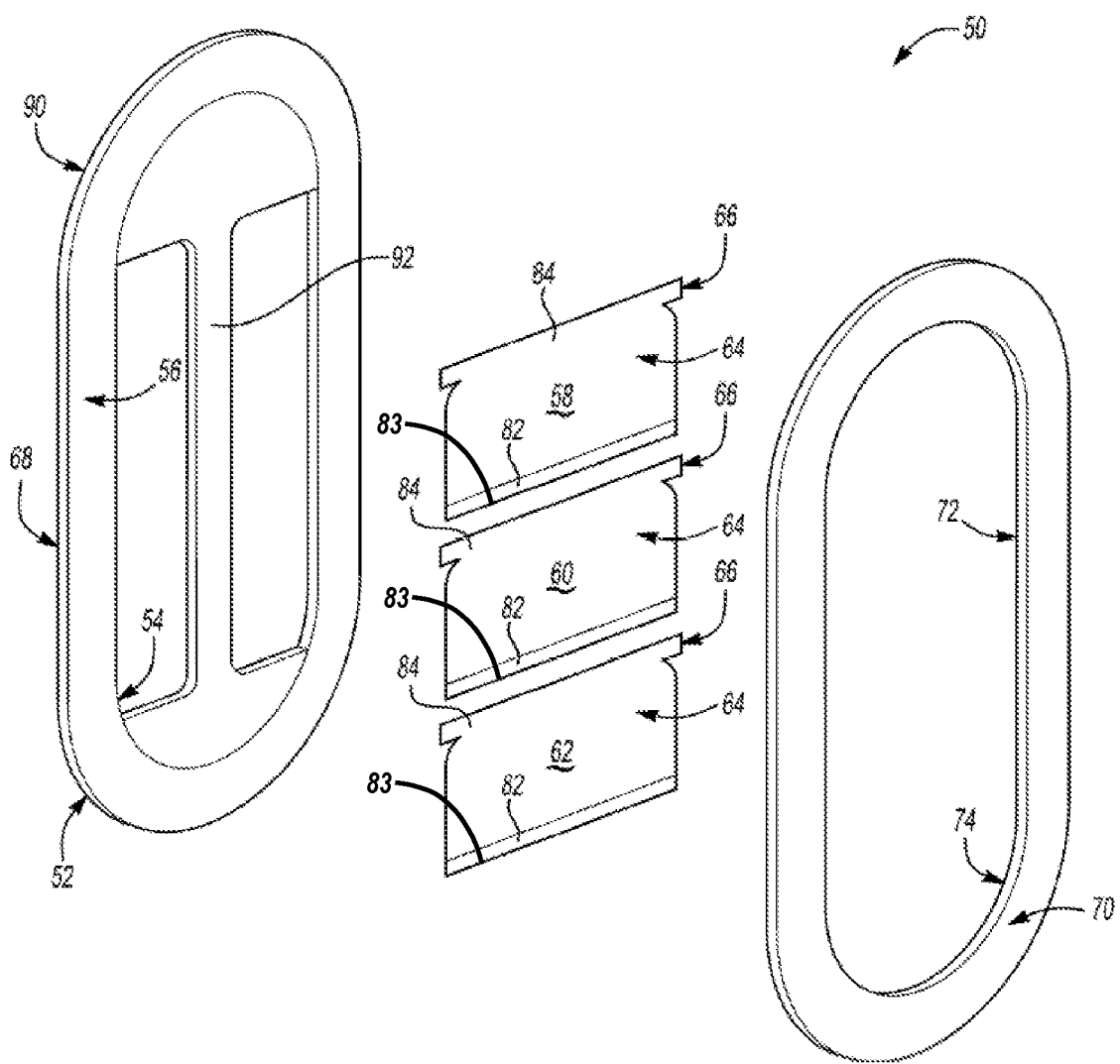
FIG. 5 is illustrates representative components and assembly method for the cabin pressure relief device according to an embodiment.

As depicted in FIG. 5, at least one embodiment includes a strip 92 which spans across aperture 54 of the base layer 52. The strip 92 can further aid in preventing the flaps 58, 60, 62 from inverting to the inner side of the base layer 52. Although depicted as a single vertical strip, it is contemplated that the strip 92 may comprise a plurality of strips having various configurations.

In at least one alternative embodiment (not shown), the retainer layer is comprised of two separate retainer strips of adhesive tape. The retainer strips are configured similar to above embodiments where the inner surface of the retainer layer is disposed on top of the second portion of the sealing members, thereby affixing only the second portion of the sealing member to the base layer. The first portion of each sealing member remains free allowing displacement, similar to the above embodiments. The two separate retainer strips are disposed on opposing sides of the apertures, and are long enough to capture the second portions of each sealing member.

In at least one further embodiment, the functionality of the unidirectional airflow device is validated after being installed on the vehicle body. A predetermined steady state air positive air pressure may be applied to the vehicle passenger cabin such that the pressure in the cabin exceeds the ambient air pressure by a first predetermined threshold. For example, an external machine for providing pressure can be fluidly connected to the passenger cabin through a vehicle opening, such as window. Once pressure is applied, the unidirectional airflow device responds to the pressure application by exhausting airflow through the tooling access hole. The quantity of volumetric airflow may be measure and compared to predetermined airflow targets in order to validate that a target amount of air exhaustion is achieved. The external machine may be reversed to a vacuum mode while still fluidly connected to the vehicle passenger cabin, thereby causing a negative air pressure inside the cabin. The pressure is lowered to an amount that is less than the ambient air pressure by a second predetermined threshold amount. The unidirectional airflow device may respond by substantially sealing the aperture over which it is attached, thereby restricting air from entering the vehicle through the aperture. Similar to the above positive pressure scenario, the volumetric airflow can be quantified in order to validate the degree of sealing that the unidirectional airflow device achieves.

Figure 6:
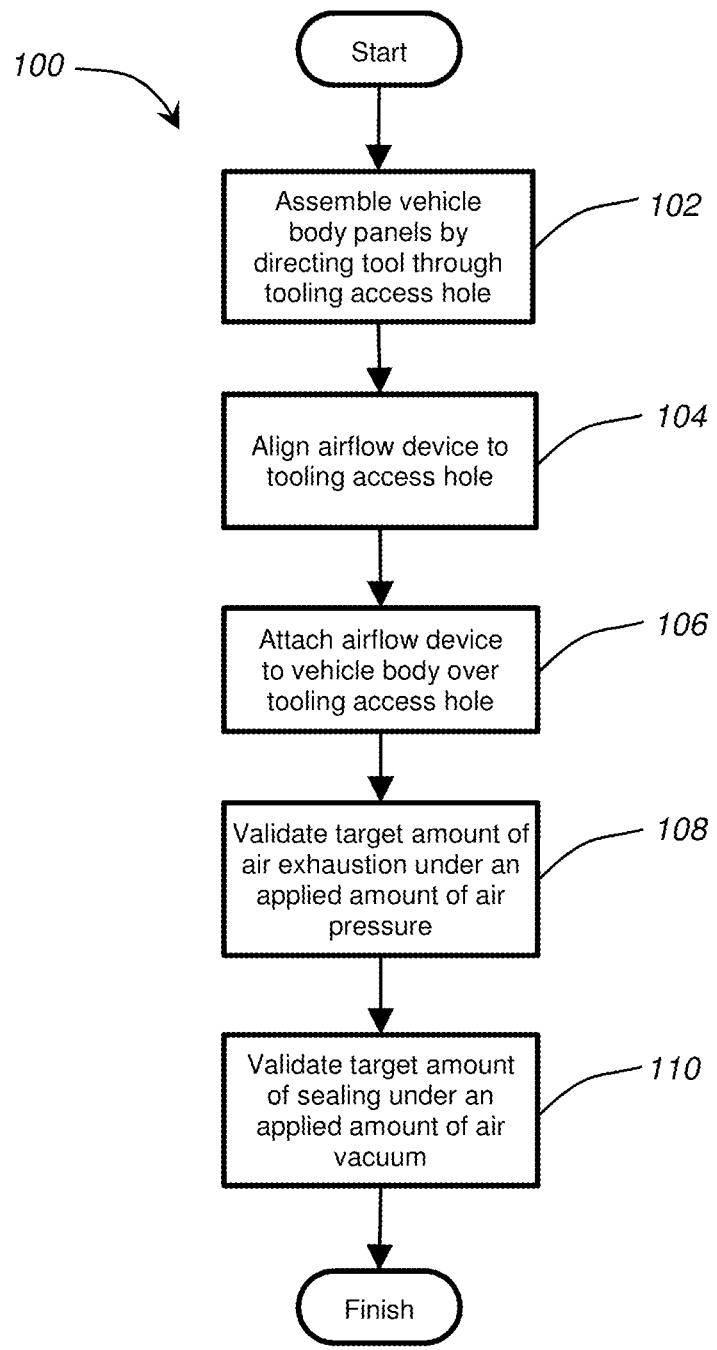
FIG. 6 depicts a method of repurposing a body structure tooling hole according to an embodiment.

FIG. 6 depicts a flowchart of a method of re-purposing a body tooling access hole according to an embodiment. The method is generally indicated by reference numeral 100. Step 102 includes assembling vehicle body panels using a tool directed through the body structure tooling access hole. Once the vehicle body is assembled, a unidirectional airflow device is aligned in step 104 to the tooling access hole. The airflow device is installed in step 106 such that the device covers the tooling access hole. The remainder of the vehicle may be assembled independently of the airflow device. Once the vehicle is substantially assembled, the operation of the airflow device can be validated. In at least one embodiment, a predetermined amount of air pressure is applied in step 108 to the vehicle passenger cabin such that an amount of air exhausted through the airflow device is validated. In at least one further embodiment, a predetermined air vacuum is applied in step 110 to the vehicle passenger cabin such that the airflow device substantially seals the tooling access hole, and a degree of sealing is validated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device comprising:
    a base layer adapted for surrounding a vehicle aperture and defining a through hole;
    a plurality of flaps each having laterally outwardly extending integrally formed tabs; and
    a retainer layer disposed on the base layer and surrounding the aperture such that the tabs are sandwiched between the base and retainer layers, wherein the flaps cooperate to substantially seal the vehicle aperture in response to ambient pressure exceeding vehicle cabin pressure, wherein each of the plurality of flaps further comprises a first end having a semi-rigid support member and a second end having a width that is greater than a distance across a width of the through hole, wherein each flap is pivotable about the semi-rigid support member, wherein the semi-rigid support member has a stiffness greater than an adjacent portion of the flap, and wherein the second end of at least one of the plurality of flaps overlaps the first end of an adjacent flap when the at least one flap is in a closed position.

2. The device of claim 1 further comprising an adhesive material disposed on an inner surface of the base layer opposite to the plurality of flaps and configured to secure the device to a vehicle body.

3. The device of claim 1 wherein the second end of each of the plurality of flaps further comprises a sealing medium configured to inhibit air flow from returning into a vehicle cabin when the flap is in the closed position.

* * * * *